Aug. 20, 1974 L. H. PLUMER Re. 28,120

SHUT-OFF NOZZLE FOR CAULKING CARTRIDGE

Original Filed Dec. 22, 1970 2 Sheets-Sheet 1

INVENTOR
LAWRENCE H. PLUMER
BY
Bacon & Thomas
ATTORNEYS

SHUT-OFF NOZZLE FOR CAULKING CARTRIDGE

Original Filed Dec. 22, 1970 2 Sheets-Sheet 2

INVENTOR
LAWRENCE H. PLUMER
BY
Bacon & Thomas
ATTORNEYS

United States Patent Office

Re. 28,120
Reissued Aug. 20, 1974

28,120

SHUT-OFF NOZZLE FOR CAULKING CARTRIDGE

Lawrence H. Plumer, Rutland, Vt., assignor to Rutland Fire Clay Company, Rutland, Vt.

Original No. 3,658,213, dated Apr. 25, 1972, Ser. No. 100,752, Dec. 22, 1970. Application for reissue Aug. 22, 1972, Ser. No. 282,725
Int. Cl. G01f *13/00*
U.S. Cl. 222—326 16 Claims

Matter enclosed in heavy brackets [ ] appears in the original patent but forms no part of this reissue specification; matter printed in italics indicates the additions made by reissue.

ABSTRACT OF THE DISCLOSURE

The end wall of the cartridge and the closure disc carried by the dispensing nozzle, each have a small discharge opening formed therein and, by rotating the nozzle relative to the end wall, the openings may be brought into alignment for discharging material from the cartridge or moved out of alignment for preventing the flow of caulking material from the cartridge.

This invention relates to an improved shut-off nozzle for cartridges of caulking compound or other mastic material which is extruded from the nozzle as a result of pressure applied to the material in the cartridge.

The present caulking cartridge is adapted to be placed in a caulking gun and pressure applied to the caulking material in the cartridge by a piston carried by the gun. The discharge of the caulking material from the cartridge may be controlled by rotating the dispensing nozzle relative to the cartridge body without relieving or discontinuing the pressure exerted on the caulking material within the cartridge.

An object of this invention is to provide a shut-off nozzle for a caulking cartridge which will effectively control the flow of caulking material from the cartridge while the material is under pressure.

Another object of the invention is to provide a shut-off noozle which is relatively easy to manipulate.

A further object is to provide a shut-off nozzle formed of relatively few inexpensive parts.

These and other objects and advantages of the invention will become more apparent from the following detailed description of a preferred form of the invention when taken in conjunction with the drawings in which.

Figure 1:
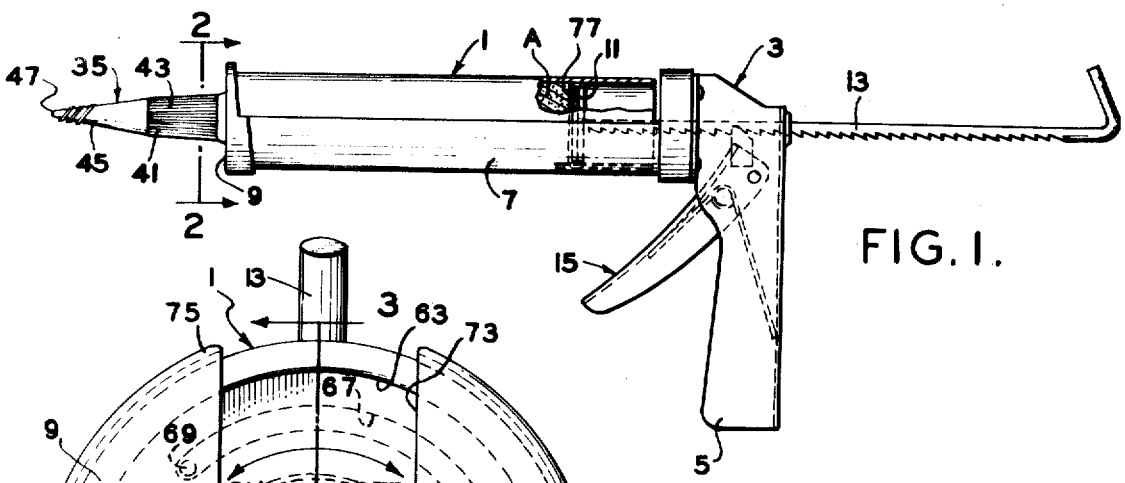
FIG. 1 is a side elevational of a caulking gun, partly broken away, with a caulking cartridge, having a shut-off nozzle of the present invention mounted therein.
Figure 2:
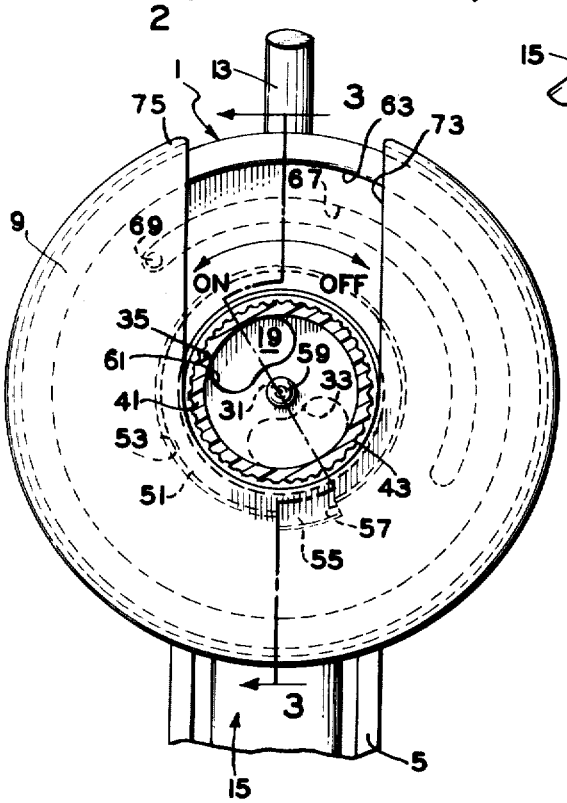
FIG. 2 is an enlarged and elevational view, partly in section, as viewed on the line 2—2 of FIG. 1 with the dispensing nozzle in closed position.

In FIG. 1 of the drawings, the cauling cartridge 1 is shown mounted in a caulking gun 3 which includes a handle 5, an elongated, semi-cylindrical chamber member 7 extending forwardly from the handle 5, a front wall 9 fixed to the outer end of the chamber member 7, a piston 11 fixed on the forward end of a pressure rod 13, and a trigger assembly 15 engageable with the pressure rod 13 for advancing the piston 11 in the chamber 7.

Figure 3:
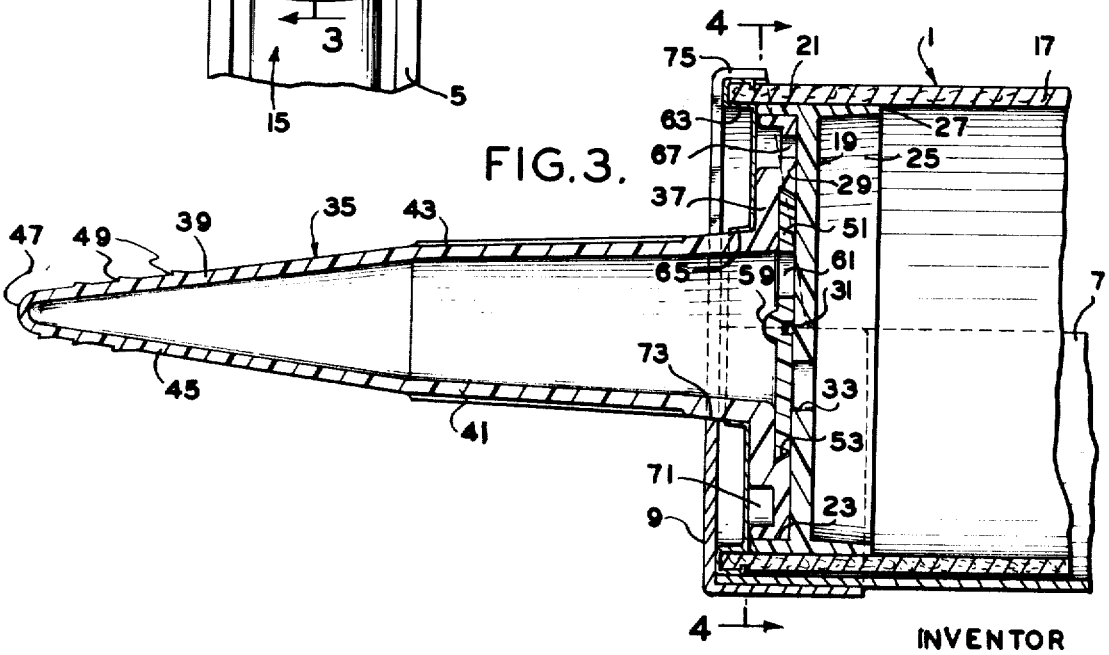
FIG. 3 is a fragmentary vertical sectional view taken on the line 3—3 of FIG. 2.
Figure 4:
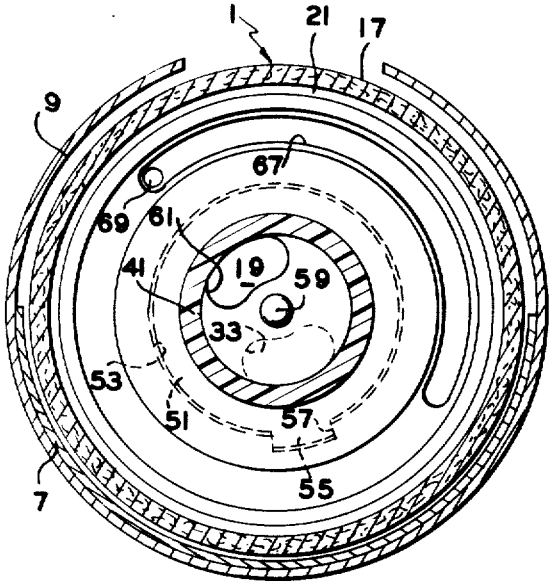
FIG. 4 is a vertical sectional view, taken on the line 4—4 of FIG. 3.
Figure 5:
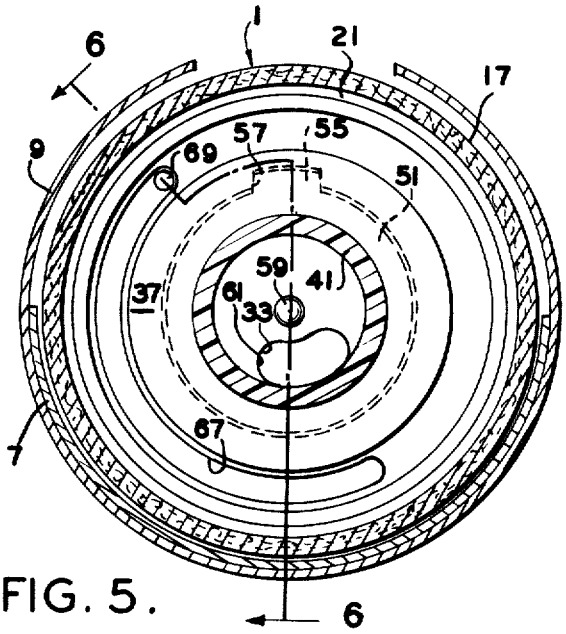
FIG. 5 is a vertical sectional view, similar to FIG. 4 but showing the nozzle in opened position.
Figure 7:
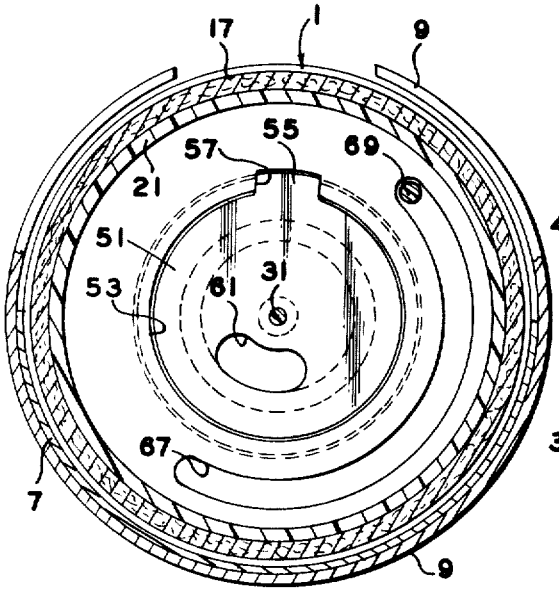
FIG. 7 is a vertical sectional view taken on the line 7—7 of FIG. 6.
Figure 6:
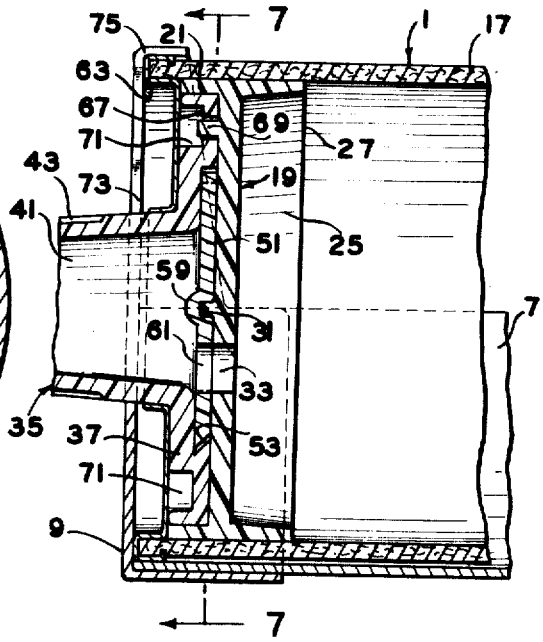
FIG. 6 is a fragmentary staggered vertical sectional view, taken on the line 6—6 of FIG. 5.
Figure 8:
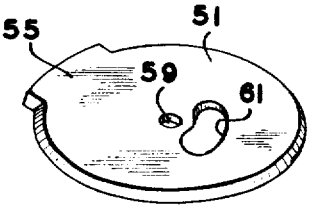
FIG. 8 is a perspective view of the closure disc of the dispensing nozzle.

As shown in FIG. 3, the caulking cartridge 1 includes a substantially rigid cylindrical body 17 formed of paperboard or the like which preferably has been treated or coated so that it will not absorb constituents of caulking material A and will present a surface to which the caulking material does not tend to adhere.

The outer end of the caulking cartridge is closed by a circular end wall 19 preferably formed from polyethylene or other suitable plastic material. The end wall 19 includes an annular shoulder portion 21 which extends forwardly from the outer edge of the end wall 19 and provides therewith a circular depression 23. A cylindrical shaped, annular flange 25 extends rearwardly from the outer edge of the circular end wall 19 and the inner surface of the flange 25 converges from the free edge 27 thereof towards the end wall 19, thereby presenting a relatively narrow free edge to the caulking material A.

The outer diameter of the end wall 19 and the shoulder 21 and the flange 25 is a tight fit in the end of the body. The end wall 19 may be secured position in positioning the body 17, if desired, by a suitable adhesive or bonding technique.

The outer surface 29 of the end wall 19 is provided at its center with a short, outstanding cylindrical pivot pin 31 and a kidney shaped dispensing opening 33 is formed in the end wall 19 and offset radially outwardly from the axial center of the end wall a predetermined distance.

A dispensing nozzle 35 having a circular base 37 and outwardly extending discharge tip 39 is rotatably mounted on the caulking cartridge adjacent the outer surface 29 of the end wall 19. As shown, the base 37 of the dispensing nozzle is circular and is seated in the circular depression 23 with its outer periphery a close, free rotating fit within the inner periphery of the shoulder portion 21.

The discharge tip 39 includes a first portion 41 which extends outwardly from the base 37 for a substantial distance and which is knurled on its outer surface so as to provide an area for manually grasping and rotating the nozzle. This first portion of the discharge tip is tapered and converges from the base 37 outwardly. A second portion 45 of the discharge tip 39 extends outwardly from the outer end of the first portion 41 and converges at a greater angle than the first portion to its outer end 47 where it is closed. The outer end of the second portion 45 is provided with guide ridges 49 which indicate diagonal lines on which the end of the discharge tip may be severed so that the caulking material may be extruded from the cartridge.

A closure disc 51 is carried on the inner surface of the base 37 of the dispensing nozzle for rotation therewith. In the preferred arrangement, the inner surface of the base 37 is formed with a circular recess 53 in which the closure disc 51 is mounted. In order to prevent relative rotation between the base 37 of the dispensing nozzle 35 and the closure disc 51, a radially outwardly extending key 55 is formed integral with the closure disc and is received in a cooperating keyway 57 formed in the base 37. The annular wall of the recess 53 is tapered to cooperate with the tapered peripheral wall of the closure disc 51 so that the closure disc may be snapped into and held in the recess to facilitate assembly of the shut-off nozzle.

The pivot pin 31 is rotatably mounted in a cylindrical recess 59 formed on the inner surface of the closure disc 51 and the closure disc is provided with a kidney shaped port 61 which is offset from the axial center of the closure disc 51 a predetermined distance which is the same as the same as the distance that the dispensing opening 33 is offset radially from the center of the end wall. The inner surface of the closure disc 51 is in sliding frictional engagement with the opposed surface of the end wall 19 and the closure disc 51 provides a valve closure for the dispensing opening 33.

The dispensing nozzle 35 and the closure disc 51 are held in position for rotation relative to the end wall 19 by means of a resilient metal collar member 63 which is tightly crimped at its periphery to the outer end of the body 17 of the caulking cartridge. The opening 65 at the center of the collar member 63 which fits closely around the base of the first portion 41 of the discharge tip 39 and the intermediate portion of the collar members 63, that is the portion between the crimped periphery and the flanged opening, bear resiliently against the outer surface of the base 37 in sliding frictional relationship therewith and thereby urge the closure disc 51 into frictional engagement with the opposed surface of the end wall 19. The free edge of the shoulder 21 abuts against the inner surface of the collar 63 and maintains the collar and the end wall spaced apart the distance required for mounting the dispensing nozzle in the manner described above.

In the preferred arrangement of the invention disclosed in this application, the dispensing nozzle 35 is mounted for rotation on the end of the body 17 coaxial with the axis of the body and relative rotation between the dispensing nozzle 35 and the body 17 of the caulking cartridge will selectively move the port 61 into or out of alignment with the dispensing opening 33 for controlling the flow of the caulking material.

In order to assure alignment of port 61 with the dispensing opening 33 when it is desired to extrude caulking material, the base 37 of the dispensing nozzle 35 is provided with an arcuate slot 67 which cooperates with a short cylindrical pin 69 rigid with the end wall 19 and extending outwardly therefrom for a short distance. The slot 67 is concentric with the axis of rotation of the nozzle and is disposed radially outwardly beyond the recess 53. Preferably, the outer surface of the base 37 is provided with an annular channel 71 and the arcuate slot 67 is formed in the bottom wall of the channel 71. One end of the arcuate slot 67 is arranged to abut against the pin 69 when the nozzle is rotated to the "on" position with the port 61 in alignment with the dispensing opening 33, and the arcuate slot is of sufficient length to permit the port 61 to be rotated completely out of communication with the dispensing opening 33 when the dispensing nozzle 35 is rotated relative to the body 17 to an "off" position. The caulking cartridge preferably carries indicia indicating the direction to rotate the dispensing nozzle for bringing the port 61 into alignment with the dispensing opening 33 and for moving the port out of alignment with the dispensing opening.

The front wall 19 of the caulking gun 3 is provided with an opening through which the discharge tip of the dispensing nozzle extends. The opening 73 is illustrated as being a vertical slot extending downwardly from the upper periphery of the front wall 9, permitting the caulking cartridge 1 to be inserted laterally into the chamber 7 and then to be moved forwardly a short distance so as to be held by the rearwardly extending flange 75 of the front wall 9.

It is believed that the operation of the shut-off nozzle of the present caulking cartridge will be obvious from the above description. Briefly, pressure is applied to the caulking material in a caulking cartridge mounted in a caulking gun by actuating the trigger assembly 15, thereby forcing the piston 11 against the dispensing piston 77 which is disposed in the body 17 at the rear surface of the caulking material. With the caulking material thus under pressure, and with the outer end 47 of the discharge tip removed, the caulking material may be extruded by bringing the port 61 into alignment with the dispensing opening 33 and, when it is desirable to interrupt the discharge of the caulking material, the knurled portion 43 of the discharge tip 39 may be manually grasped and the discharge nozzle rotated relative to the body 17 to move the port 61 out of communication with the dispensing opening 33 without relieving the pressure applied to the caulking material by way of the piston 11 and pressure rod 13.

While a preferred form of the invention is disclosed herein, such modifications, changes and alterations as would occur to one skilled in the art are to be considered within the purview of this invention as fall within the scope of the appended claims.

What I claim is:

1. A [caulking] cartridge having a shut-off nozzle for controlling the discharge of [caulking] material under pressure [therein], comprising: an elongated [substantially rigid] cylindrical body; an end wall closing one end of the body and having a dispensing opening formed therein; [a dispensing piston slidably mounted in said body for movement from the end of said body opposite said end wall to adjacent said end wall in response to pressure applied thereto;] a dispensing nozzle having a base disposed adjacent to [the outer surface of] said end wall and having a discharge tip extending outwardly from said base, *said base having a recess therein;* means mounting the nozzle on said body for rotation relative thereto, a closure [disc mounted] *means seated in said recess,* [on] [the inner surface of] said *closure means* [base] [for rotation therewith and] having a port formed therein for [cooperation] *communication* with [the] *a* discharge passage [of] *in* said tip, [the inner surface of the] *said* closure [disc] *means* being in [sliding frictional] engagement with [the opposed surface of] said end wall and providing a valve closure for said dispensing opening; the port in said closure [disc] *means* and the dispensing opening in said end wall being offset radially with respect to the axis of rotation of the dispensing nozzle [and being offset by substantially the same distance], whereby upon rotation of the dispensing nozzle and closure [disc] *means* relative to said body, the port in said closure [disc] *means* may be selectively brought into alignment with said dispensing opening for discharging [caulking] material under pressure in the cartridge or moved out of alignment therewith for closing the dispensing opening and preventing the flow of said [caulking] material under pressure therethrough.

[2. A caulking cartridge according to claim 1 in which said inner surface of the base is recessed and said closure disc is seated in said recess.]

3. A [caulking] cartridge according to claim *1* [2] in which the closure [disc] *means* is *a* circular *disc* and includes a key extending outwardly from one side thereof and the recess in the base is circular and formed with a depressed keyway at one side thereof, the periphery of said closure disc fitting closely within said recess and said key fitting closely within said keyway.

4. A [caulking] cartridge according to claim 3 in which stop means is provided for limiting rotation of the dispensing nozzle in one direction of its rotation relative to the body and for aligning said port with said dispensing opening.

5. A [caulking] cartridge according to claim 4 in which said stop means comprises an arcuate slot formed in the base of the nozzle concentric with the axis of rotation of the nozzle and disposed radially outwardly beyond said recess and a pin rigid with the end wall and extending into the arcuate slot.

6. A [caulking] cartridge according to claim *1* [5] in which the [outer surface of the] end wall is provided with a circular depression and the base of the nozzle is circular and is disposed for rotation in said depression.

7. A [caulking] cartridge according to claim 6 in which said means mounting said nozzle on said body comprises a collar member fixedly attached at its periphery to said one end of the body, said collar member having a central opening through which said discharge tip extends with a close rotating fit and an intermediate portion between its periphery and its central opening bearing aginst [the] *an* outer surface of said base and holding said closure disc in frictional engagement with *said depression* [the depressed outer surface] of said end wall.

8. A [caulking] cartridge according to claim 7 in which the outer periphery of the discharge tip is knurled in the area adjacent said base.

9. A [caulking] cartridge according to claim 7 in which the axis of rotation of said dispensing nozzle is coaxial with the axis of said body.

10. A [caulking] cartridge according to claim 1 in which stop means is provided for limiting rotation of the dispensing nozzle in one direction of its rotation relative to the body and for aligning said port with said dispensing opening.

11. A [caulking] cartridge according to claim 1 in which said means mounting said nozzle on said body comprises a collar member fixedly attached at its periphery to said one end of the body, said collar member having a central opening through which said discharge tip extends and an intermediate portion between its periphery and its central opening bearing against [the] *an* outer surface of said base and holding said closure [disc] *means* in fractional engagement with [the outer surface of] said end wall.

12. A [caulking] cartridge according to claim [1] *11* in which the intermediate portion of the collar member is resilient.

13. A [caulking] cartridge according to claim 1 in which the outer periphery of the discharge tip is knurled in the area adjacent said base.

14. A [caulking] cartridge according to claim 1 in which the axis of rotation of said dispensing nozzle is coaxial with the axis of said body.

*15. A cartridge having a shut-off nozzle for controlling the discharge of material comprising:*

*(a) an elongated body portion having a hollow interior;*

*(b) a wall having an opening formed therein;*

*(c) a dispensing nozzle having a base disposed adjacent one surface of said wall and having a discharge tip extending outwardly from said base, said discharge tip being axially elongated and including a converging portion;*

*(d) means mounting said nozzle on said body portion for rotation relative thereto, said mounting means comprising a collar member fixedly attached to one end of said body portion, said collar member having a resilient portion extending transversely across said hollow interior of said body portion, said resilient portion having an aperture thrugh which said discharge tip extends, said wall being disposed within said hollow body portion and being spaced from said resilient portion, said base being disposed between said wall and said resilient portion, said resilient portion urging said base into tightly fitting relationship with said wall to prevent leakage of material between said base and said wall;*

*(e) said nozzle having a port formed therein in the region of said base and a discharge passage through said tip, said port communicating with said discharge passage;*

*(f) said port and said opening being radially offset with respect to the axis of rotation of said nozzle;*

*(g) whereby, upon rotation of the nozzle relative to said body, said port may be selectively brought into cooperation with said opening for effecting communication between said interior and said discharge passage and moved out of cooperation with said opening for preventing communication therebetween.*

*16. A cartridge according to claim 15 further including a shoulder associated with said wall, said shoulder being engageable with said transversely extending portion to provide a space between said wall and said transversely extending portion, said base being disposed in said space and being rotatable therein.*

*17. A cartridge according to claim 16, wherein said shoulder is an integral portion of said wall.*

References Cited

The following references, cited by the Examiner, are of record in the patented file of this patent or the original patent.

UNITED STATES PATENTS

| | | | |
|---|---|---|---|
| 2,755,003 | 7/1956 | Sherbondy | 222—387 X |
| 2,985,343 | 5/1961 | Mask | 222—555 X |
| 3,339,810 | 9/1967 | Block et al. | 222—548 X |
| 816,313 | 3/1906 | Goss | 222—548 |
| 3,237,819 | 3/1966 | Fillmore | 222—548 |
| 3,367,545 | 2/1968 | Cook | 222—327 X |

ROBERT B. REEVES, Primary Examiner

J. P. SHANNON, Assistant Examiner

U.S. Cl. X.R.

222—387, 555